United States Patent
Sakurai

(10) Patent No.: US 10,738,178 B2
(45) Date of Patent: Aug. 11, 2020

(54) RUBBER COMPOSITION, METHOD FOR PRODUCING SAME, AND TIRE

(71) Applicant: BRIDGESTONE CORPORATION, Tokyo (JP)

(72) Inventor: Hideyuki Sakurai, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 102 days.

(21) Appl. No.: 15/526,830

(22) PCT Filed: Nov. 25, 2015

(86) PCT No.: PCT/JP2015/005856
§ 371 (c)(1),
(2) Date: May 15, 2017

(87) PCT Pub. No.: WO2016/084370
PCT Pub. Date: Jun. 2, 2016

(65) Prior Publication Data
US 2019/0085156 A1  Mar. 21, 2019

(30) Foreign Application Priority Data

Nov. 27, 2014 (JP) .................. 2014-240664

(51) Int. Cl.
| | | |
|---|---|---|
| C08L 7/00 | (2006.01) | |
| C08K 3/36 | (2006.01) | |
| B60C 1/00 | (2006.01) | |
| C08L 101/00 | (2006.01) | |
| C08K 3/04 | (2006.01) | |
| C08L 61/06 | (2006.01) | |
| C08L 93/04 | (2006.01) | |
| C08K 5/09 | (2006.01) | |
| C08K 5/31 | (2006.01) | |
| C08L 57/02 | (2006.01) | |
| C08K 5/47 | (2006.01) | |
| C08K 5/18 | (2006.01) | |
| C08K 3/22 | (2006.01) | |
| C08L 9/00 | (2006.01) | |
| C08L 45/00 | (2006.01) | |
| C08K 3/06 | (2006.01) | |
| C08K 5/548 | (2006.01) | |
| C08J 3/20 | (2006.01) | |

(52) U.S. Cl.
CPC .................. *C08L 7/00* (2013.01);
*B60C 1/00* (2013.01); *B60C 1/0016* (2013.01);
*C08J 3/203* (2013.01); *C08K 3/04* (2013.01);
*C08K 3/06* (2013.01); *C08K 3/22* (2013.01);
*C08K 3/36* (2013.01); *C08K 5/09* (2013.01);
*C08K 5/18* (2013.01); *C08K 5/31* (2013.01);
*C08K 5/47* (2013.01); *C08K 5/548* (2013.01);
*C08L 9/00*
(2013.01); *C08L 45/00* (2013.01); *C08L 57/02*
(2013.01); *C08L 61/06* (2013.01); *C08L 93/04*
(2013.01); *C08L 101/00* (2013.01); *C08L 2205/03* (2013.01); *C08L 2205/035* (2013.01)

(58) Field of Classification Search
CPC .. C08L 7/00; C08L 2205/03; C08L 2205/035; C08J 3/203
See application file for complete search history.

(56) References Cited

U.S. PATENT DOCUMENTS

| | | | |
|---|---|---|---|
| 4,748,199 | A | 5/1988 | Takiguchi et al. |
| 2002/0095008 | A1 | 7/2002 | Heinrich et al. |
| 2013/0281590 | A1 | 10/2013 | Lin et al. |
| 2014/0235751 | A1 | 8/2014 | Lesage et al. |
| 2014/0243448 | A1 | 8/2014 | Lesage et al. |
| 2015/0183971 | A1 | 7/2015 | Kawashima |

FOREIGN PATENT DOCUMENTS

| | | |
|---|---|---|
| CN | 103298871 A | 9/2013 |
| CN | 103827196 A | 5/2014 |
| CN | 103987773 A | 8/2014 |
| EP | 2772511 A1 | 9/2014 |
| EP | 2799480 A1 | 11/2014 |
| JP | 09111039 A | 4/1997 |
| JP | 2002-179842 A | 6/2002 |
| JP | 2008-143485 A | 6/2008 |
| JP | 4372171 B2 | 11/2009 |
| JP | 2010-031262 A | 2/2010 |

(Continued)

OTHER PUBLICATIONS

Communication dated Oct. 27, 2017 from the European Patent Office in counterpart European application No. 15863261.2.

(Continued)

*Primary Examiner* — Robert S Jones
(74) *Attorney, Agent, or Firm* — Sughrue Mion, PLLC

(57) ABSTRACT

Provided is a rubber composition that can improve fuel efficiency of a tire in low-temperature environments while ensuring adequate wet performance of the tire. The rubber composition contains: a rubber component (A) including at least 50 mass % of at least one isoprene-based rubber selected from the group consisting of natural rubber and synthetic isoprene rubber; a thermoplastic resin (B); and a filler (C) including at least 70 mass % of silica. The thermoplastic resin (B) is contained in an amount of from 5 parts by mass to 40 parts by mass relative to 100 parts by mass of the rubber component (A). The rubber composition has a tan δ at 0° C. of no greater than 0.5, a difference between tan δ at 30° C. and tan δ at 60° C. of no greater than 0.070, and a storage modulus at 1% dynamic strain and 0° C. of no greater than 20 MPa.

11 Claims, No Drawings

(56) References Cited

FOREIGN PATENT DOCUMENTS

| | | |
|---|---|---|
| JP | 2010-235663 A | 10/2010 |
| JP | 2011-246561 A | 12/2011 |
| JP | 2012-092179 A | 5/2012 |
| JP | 2014-009234 A | 1/2014 |
| JP | 2014009324 A | 1/2014 |
| JP | 2014-502658 A | 2/2014 |
| JP | 2014-047295 A | 3/2014 |
| JP | 2014-173062 A | 9/2014 |
| WO | 2013/045483 A1 | 4/2013 |
| WO | 2013045482 A1 | 4/2013 |
| WO | 2013/077020 A1 | 5/2013 |

OTHER PUBLICATIONS

International Search Report for PCT/JP2015/005856 dated Dec. 28, 2015 [PCT/ISA/210].
Communication dated Mar. 9, 2018 from the State Intellectual Property Office of the P.R.C. in counterpart Chinese application No. 2015800642307.
Search Report dated Feb. 14, 2020, from the Brazilian Patent and Trademark Office in application No. BR112017011148-9.

RUBBER COMPOSITION, METHOD FOR PRODUCING SAME, AND TIRE

CROSS REFERENCE TO RELATED APPLICATIONS

This application is a National Stage of International Application No. PCT/JP2015/005856 filed Nov. 25, 2015, claiming priority based on Japanese Patent Application No. 2014-240664 filed Nov. 27, 2014, the contents of all of which are incorporated herein by reference in their entirety.

TECHNICAL FIELD

This disclosure relates to a rubber composition, a method for producing the rubber composition, and a tire.

BACKGROUND

Demand for vehicles with lower fuel consumption is continuing to grow with the global movement toward reduction in carbon dioxide emissions, resulting from increasing recent interest in environmental issues. In order to respond to this demand, there is also need to improve tire performance by reducing rolling resistance.

When developing a rubber composition for use in a tire tread, which contributes to the rolling resistance of a tire, it is generally effective to use the loss tangent (tan δ) at around 60° C. as an indicator in consideration of the fact that the temperature of a tire during normal running reaches approximately 60° C. Specifically, when a rubber composition having a low tan δ at around 60° C. is used in tread rubber, heat buildup in a tire can be inhibited, rolling resistance can be reduced, and, as a result, fuel efficiency of the tire can be improved (PTL 1).

It is also important to ensure braking performance on a wet road surface (hereinafter, referred to simply as "wet braking performance") in order to enable safer running of a vehicle. Accordingly, there is demand for improving fuel efficiency of a tire while also ensuring wet braking performance of the tire.

In response to this demand, PTL 2 discloses a technique for improving wet braking performance in which tan δ of a rubber composition for a tire tread is set as at least 0.95 at 0° C.

CITATION LIST

Patent Literature

PTL 1: JP 2012-092179 A
PTL 2: JP 2014-9234 A

SUMMARY

Technical Problem

However, studies conducted by the inventor have revealed that although a tire in which a rubber composition having a low tan δ at around 60° C. and a high tan δ at around 0° C. is used in tread rubber has excellent fuel efficiency during running in normal-temperature environments and excellent wet performance, there is room for further improvement over this tire in terms of fuel efficiency during running in low-temperature environments.

In response, it may be possible to improve the fuel efficiency of a tire in low-temperature environments by lowering the loss tangent (tan δ) at 60° C. or lower of a rubber composition used in tread rubber.

However, simply using a rubber composition having a low tan δ at 60° C. or lower for tread rubber also lowers tan δ at around 0° C., which is related to the coefficient of friction (μ) of a tire on a wet road surface. This leads to a problem of the tire having a lower coefficient of friction (μ) on a wet road surface, and thus having poorer wet performance.

One objective of this disclosure is to solve the problems experienced by the conventional techniques set forth above by providing a rubber composition that can preserve fuel efficiency of a tire in normal-temperature environments while reducing the difference between fuel efficiency of the tire in normal-temperature environments and fuel efficiency of the tire in low-temperature environments, and that can ensure adequate wet performance.

Another objective of this disclosure is to provide a tire that can preserve fuel efficiency thereof in normal-temperature environments while reducing the difference between fuel efficiency thereof in normal-temperature environments and fuel efficiency thereof in low-temperature environments, and that can ensure adequate wet performance.

Solution to Problem

As a result of diligent investigation conducted to achieve the objectives set forth above, the inventor discovered that the fuel efficiency of a tire in low-temperature environments can be improved while ensuring adequate wet performance of the tire by using, in tread rubber of the tire, a rubber composition that contains a specific rubber component (A), thermoplastic resin (B), and filler (C), and that has a tan δ at 0° C. that is no greater than a specific value, and a difference between tan δ at 30° C. and tan δ at 60° C. that is no greater than a specific value. This discovery led to the present disclosure.

Specifically, a presently disclosed rubber composition contains:
    a rubber component (A) including at least 50 mass % of at least one isoprene-based rubber selected from the group consisting of natural rubber and synthetic isoprene rubber;
    a thermoplastic resin (B); and
    a filler (C) including at least 70 mass % of silica, wherein
    the thermoplastic resin (B) is contained in an amount of from 5 parts by mass to 40 parts by mass relative to 100 parts by mass of the rubber component (A),
    tan δ of the rubber composition at 0° C. is no greater than 0.5,
    a difference between tan δ of the rubber composition at 30° C. and tan δ of the rubber composition at 60° C. is no greater than 0.070, and
    a storage modulus (E') of the rubber composition at 1% dynamic strain and 0° C. is no greater than 20 MPa.

Use of the presently disclosed rubber composition in tread rubber of a tire can improve fuel efficiency of the tire in low-temperature environments while ensuring adequate wet performance of the tire.

Moreover, since the presently disclosed rubber composition has high flexibility at low temperatures, use of the rubber composition in tread rubber of a tire can improve grounding performance of the tread rubber and can improve wet performance of the tire.

The presently disclosed rubber composition preferably has a tensile strength (Tb) of at least 20 MPa. In this case, use of the rubber composition in tread rubber raises the rigidity of the tread rubber as a whole and can improve tire wet performance due to the tread rubber having a sufficient deformation volume.

The difference between tan δ of the presently disclosed rubber composition at 0° C. and tan δ of the presently disclosed rubber composition at 30° C. is preferably no greater than 0.30, and is more preferably from 0.14 to 0.30. In this case, use of the rubber composition in tread rubber of a tire can improve wet performance of the tire while reducing the temperature dependence of fuel efficiency of the tire.

The difference between tan δ of the presently disclosed rubber composition at 0° C. and tan δ of the presently disclosed rubber composition at 60° C. is preferably no greater than 0.35. In this case, use of the rubber composition in tread rubber of a tire can reduce the temperature dependence of fuel efficiency of the tire.

The presently disclosed rubber composition preferably further contains from 1 part by mass to 5 parts by mass of a softener (D) relative to 100 parts by mass of the rubber component. This can facilitate kneading of the rubber composition while ensuring that the rubber composition is sufficiently rigid.

The softener (D) is preferably a mineral-derived or petroleum-derived softener. This further facilitates kneading of the rubber composition.

In one preferable example of the presently disclosed rubber composition, the silica is contained in an amount of from 40 parts by mass to 70 parts by mass relative to 100 parts by mass of the rubber component. In this case, use of the rubber composition in tread rubber of a tire can improve fuel efficiency of the tire during normal running and can improve wet performance of the tire.

In another preferable example of the presently disclosed rubber composition, the filler (C) further includes carbon black, and the carbon black is contained in an amount of from 1 part by mass to 10 parts by mass relative to 100 parts by mass of the rubber component. In this case, use of the rubber composition in tread rubber of a tire can provide the tire with a balance of high levels of fuel efficiency and wet performance.

In the presently disclosed rubber composition, the thermoplastic resin (B) is preferably at least one resin selected from the group consisting of a $C_5$ resin, a $C_9$ resin, a $C_5$-$C_9$ resin, a dicyclopentadiene resin, a rosin resin, an alkyl phenolic resin, and a terpene phenolic resin. Use of the above rubber composition in tread rubber of a tire can further improve wet performance of the tire.

A presently disclosed method for producing a rubber composition is a method for producing the rubber composition described above, and includes kneading the rubber component (A) including at least 50 mass % of at least one isoprene-based rubber selected from the group consisting of natural rubber and synthetic isoprene rubber, the thermoplastic resin (B), and the filler (C) including at least 70 mass % of silica at from 150° C. to 165° C., without a vulcanization compounding agent including a vulcanizing agent and a vulcanization accelerator.

The presently disclosed method for producing a rubber composition enables homogeneous dispersion of compounding agents other than the vulcanization compounding agent in the rubber component (A), enables each of the compounding agents to sufficiently exhibit the compounding effect thereof, and can lower tan δ of the rubber composition at 0° C. while reducing the difference between tan δ of the rubber composition at 30° C. and tan δ of the rubber composition at 60° C.

A presently disclosed tire includes tread rubber in which the rubber composition described above is used. The presently disclosed tire has excellent fuel efficiency in low-temperature environments and excellent wet performance as a result of including tread rubber in which the above-described rubber composition is used.

Advantageous Effect

According to the present disclosure, it is possible to provide a rubber composition that can improve fuel efficiency of a tire in low-temperature environments while ensuring adequate wet performance of the tire. Moreover, according to the present disclosure, it is possible to provide a method for producing this rubber composition. Furthermore, according to the present disclosure, it is possible to provide a tire having excellent fuel efficiency in low-temperature environments and excellent wet performance.

DETAILED DESCRIPTION

Rubber Composition

The following provides a detailed description of the presently disclosed rubber composition based on an embodiment thereof.

The presently disclosed rubber composition contains: a rubber component (A) including at least 50 mass % of at least one isoprene-based rubber selected from the group consisting of natural rubber and synthetic isoprene rubber; a thermoplastic resin (B); and a filler (C) including at least 70 mass % of silica, wherein the thermoplastic resin (B) is contained in an amount of from 5 parts by mass to 40 parts by mass relative to 100 parts by mass of the rubber component (A), tan δ of the rubber composition at 0° C. is no greater than 0.5, a difference between tan δ of the rubber composition at 30° C. and tan δ of the rubber composition at 60° C. is no greater than 0.070, and a storage modulus (E') of the rubber composition at 1% dynamic strain and 0° C. is no greater than 20 MPa.

The loss tangent (tan δ) of the presently disclosed rubber composition at low temperatures (particularly at 0° C.) is lowered due to the content of isoprene-based rubber in the rubber component (A) of the rubber composition being at least 50 mass %, and, as a result of tan δ at 0° C. being no greater than 0.5, fuel efficiency at low temperatures of a tire in which the rubber composition is used is improved.

Moreover, tan δ of the presently disclosed rubber composition at 60° C. is lowered due to the content of silica in the compounded filler (C) being at least 70 mass %, which improves fuel efficiency of a tire in which the rubber composition is used during normal running.

Furthermore, the temperature dependence of tan δ of the presently disclosed rubber composition is reduced due the difference between tan δ at 30° C. and tan δ at 60° C. being no greater than 0.070, which enables improvement of fuel efficiency of a tire in which the rubber composition is used over a wide temperature range.

In the presently disclosed rubber composition, compounding of the thermoplastic resin (B) in the prescribed amount can lower the elastic modulus in a high-strain region while suppressing lowering of the elastic modulus in a low-strain region. Consequently, when the presently disclosed rubber composition is used in tread rubber of a tire, rigidity can be ensured in a portion of the tread rubber that is distant from a contact patch with a road surface, which is a portion in which strain during running is small, while increasing the deformation volume of the tread rubber near to the contact patch with the road surface, where strain during running is large.

The coefficient of friction (μ) on a wet road surface is proportional to the product of rigidity of the tread rubber as a whole, the amount of deformation of the tread rubber, and the loss tangent (tan δ) of the tread rubber. Therefore, the coefficient of friction (μ) on a wet road surface of a tire including tread rubber in which the presently disclosed rubber composition is used can be sufficiently maintained by compensating for lowering of the loss tangent (tan δ) at low temperatures by increasing the amount of deformation of the tread rubber while ensuring rigidity of the tread rubber as a whole. Thus, a tire including tread rubber in which the presently disclosed rubber composition is used has high fuel efficiency at low temperatures due to the loss tangent (tan δ) at low temperatures being low and can ensure adequate wet performance due to the coefficient of friction (μ) on a wet road surface being high.

From a viewpoint of improving fuel efficiency at low temperatures, tan δ of the presently disclosed rubber composition at 0° C. is no greater than 0.5, preferably no greater than 0.45, and more preferably no greater than 0.4. Although tan δ of the rubber composition at 0° C. does not have a specific lower limit, tan δ at 0° C. is normally at least 0.15. If tan δ of the rubber composition at 0° C. is greater than 0.5, it is not possible to sufficiently improve tire fuel efficiency at low temperatures.

Moreover, tan δ of the presently disclosed rubber composition at 30° C. is preferably no greater than 0.4, and more preferably no greater than 0.35, and is normally at least 0.1. Furthermore, tan δ of the presently disclosed rubber composition at 60° C. is preferably no greater than 0.35, and more preferably no greater than 0.3, and is normally at least 0.05. This enables improvement of tire fuel efficiency over a wide temperature range.

From a viewpoint of reducing the temperature dependence of fuel efficiency, the difference between tan δ of the presently disclosed rubber composition at 30° C. and tan δ of the presently disclosed rubber composition at 60° C. is no greater than 0.070, preferably no greater than 0.060, more preferably no greater than 0.055, and even more preferably no greater than 0.050. The difference between tan δ at 30° C. and tan δ at 60° C. does not have a specific lower limit and may be 0. If the difference between tan δ of the rubber composition at 30° C. and tan δ of the rubber composition at 60° C. is greater than 0.070, it is not possible to sufficiently reduce the temperature dependence of tire fuel efficiency.

Moreover, from a viewpoint of improving wet performance and reducing the temperature dependence of fuel efficiency, the difference between tan δ of the presently disclosed rubber composition at 0° C. and tan δ of the presently disclosed rubber composition at 30° C. is preferably no greater than 0.30, more preferably from 0.14 to 0.30, even more preferably from 0.15 to 0.25, and particularly preferably from 0.16 to 0.20.

Furthermore, from a viewpoint of reducing the temperature dependence of fuel efficiency, the difference between tan δ of the presently disclosed rubber composition at 0° C. and tan δ of the presently disclosed rubber composition at 60° C. is preferably no greater than 0.35, more preferably no greater than 0.24, and even more preferably no greater than 0.23, and may be 0.

From a viewpoint of wet performance, the storage modulus (E') of the presently disclosed rubber composition at 1% dynamic strain and 0° C. is no greater than 20 MPa, preferably no greater than 18 MPa, and more preferably no greater than 16 MPa, and is preferably at least 3 MPa, and more preferably at least 5 MPa. The presently disclosed rubber composition has high flexibility at low temperatures as a result of the storage modulus at 1% dynamic strain and 0° C. being no greater than 20 MPa. Therefore, use of the rubber composition in tread rubber of a tire can improve grounding performance of the tread rubber and can improve wet performance of the tire.

From a viewpoint of wet performance, the tensile strength (Tb) of the presently disclosed rubber composition is preferably at least 20 MPa, and more preferably at least 23 MPa. Use of a rubber composition having a tensile strength of at least 20 MPa in tread rubber can improve the rigidity of the tread rubber as a whole.

The rubber component (A) of the presently disclosed rubber composition includes at least one isoprene-based rubber selected from the group consisting of natural rubber and synthetic isoprene rubber in an amount of at least 50 mass %, preferably at least 60 mass %, and more preferably at least 70 mass %. The content of the isoprene-based rubber in the rubber component (A) does not have a specific upper limit and the isoprene-based rubber may compose the entirety of the rubber component (A). The loss tangent (tan δ) of the rubber composition at low temperatures is lowered as a result of the content of the isoprene-based rubber in the rubber component (A) being at least 50 mass %. Accordingly, use of the rubber composition in tread rubber of a tire can improve fuel efficiency of the tire at low temperatures.

Besides natural rubber (NR) and synthetic isoprene rubber (IR), the rubber component (A) may include a synthetic diene-based rubber such as polybutadiene rubber (BR), styrene-butadiene copolymer rubber (SBR), or styrene-isoprene copolymer rubber (SIR), or may include another type of synthetic rubber. The rubber component (A) may be a single type or may be a blend of two or more types.

The presently disclosed rubber composition contains a thermoplastic resin (B). Compounding of the thermoplastic resin (B) in the rubber composition can lower the elastic modulus in a high-strain region while suppressing lowering of the elastic modulus in a low-strain region. Consequently, when the rubber composition containing the thermoplastic resin (B) is used in tread rubber of a tire, rigidity can be ensured in a portion of the tread rubber that is distant from a contact patch with a road surface, which is a portion in which strain during running is small, while increasing the deformation volume of the tread rubber near to the contact patch with the road surface, where strain during running is large. This raises the coefficient of friction (μ) on a wet road surface and can improve wet performance of the tire.

The amount of the thermoplastic resin (B) that is compounded relative to 100 parts by mass of the rubber component (A) is from 5 parts by mass to 40 parts by mass, preferably from 8 parts by mass to 30 parts by mass, and more preferably from 10 parts by mass to 20 parts by mass. Compounding of at least 5 parts by mass of the thermoplastic resin (B) relative to 100 parts by mass of the rubber component (A) can lower the elastic modulus of the rubber composition in a high-strain region, whereas compounding of no greater than 40 parts by mass of the thermoplastic resin (B) relative to 100 parts by mass of the rubber component (A) can suppress lowering of the elastic modulus of the rubber composition in a low-strain region.

The thermoplastic resin (B) is preferably a $C_5$ resin, a $C_9$ resin, a $C_5$-$C_9$ resin, a dicyclopentadiene resin, a rosin resin, an alkyl phenolic resin, or a terpene phenolic resin from a viewpoint of wet performance. One of such thermoplastic resins (B) may be used individually, or two or more of such thermoplastic resins (B) may be used in combination.

The term "$C_5$ resin" refers to a $C_5$ synthetic petroleum resin. The $C_5$ resin may, for example, be an aliphatic petroleum resin that is obtained by using a Friedel-Crafts catalyst, such as $AlCl_3$ or $BF_3$, to polymerize a $C_5$ fraction obtained by thermal cracking of naphtha in the petrochemical industry. The aforementioned $C_5$ fraction typically includes olefinic hydrocarbons such as 1-pentene, 2-pentene, 2-methyl-1-butene, 2-methyl-2-butene, and 3-methyl-1-butene; diolefinic hydrocarbons such as 2-methyl-1,3-butadiene, 1,2-pentadiene, 1,3-pentadiene, and 3-methyl-1, 2-butadiene; and the like. The $C_5$ resin may be a commercially available product. Examples include products from the "Escorez® 1000" series (Escorez is a registered trademark in Japan, other countries, or both), which are aliphatic petroleum resins produced by ExxonMobil, and the products "A100", "B170", "M100", and "R100" from the "Quintone® 100" series (Quintone is a registered trademark in Japan, other countries, or both), which are aliphatic petroleum resins produced by Nippon Zeon Co., Ltd.

The $C_9$ resin may, for example, be a resin obtained by polymerizing aromatics having a carbon number of 9, the main monomers for which are vinyl toluene, alkyl styrenes, and indene of a $C_9$ fraction that is obtained through thermal cracking of naphtha in the petrochemical industry as a by-product of basic petrochemical raw materials such as ethylene and propylene. Specific examples of the $C_9$ fraction obtained through thermal cracking of naphtha include vinyltoluene, α-methylstyrene, β-methylstyrene, γ-methylstyrene, o-methylstyrene, p-methylstyrene, vinyltoluene, and indene. In addition to the $C_9$ fraction, styrene and the like of a $C_8$ fraction; methylindene, 1,3-dimethylstyrene, and the like of a $C_{10}$ fraction; and naphthalene, vinylnaphthalene, vinylanthracene, p-tert-butylstyrene, and the like may be used as a raw material for the $C_9$ resin, and the $C_9$ resin may be obtained, for example, by using a Friedel-Crafts catalyst to copolymerize a mixture of these $C_8$ to $C_{10}$ fractions and the like. Moreover, the $C_9$ resin may be a modified petroleum resin obtained through modification with a hydroxyl group-containing compound, an unsaturated carboxylic acid compound, or the like. The $C_9$ resin may be a commercially available product. Examples of commercially available unmodified $C_9$ petroleum resins include the products "Neopolymer L-90", "Neopolymer 120", "Neopolymer 130", and "Neopolymer 140" (produced by JX Nippon Oil & Energy Corporation).

The term "$C_5$-$C_9$ resin" refers to a $C_5$-$C_9$ synthetic petroleum resin. The $C_5$-$C_9$ resin may, for example, be a solid polymer obtained by using a Friedel-Crafts catalyst, such as $AlCl_3$ or $BF_3$, to polymerize a $C_5$-$C_{11}$ fraction derived from petroleum. Specific examples include copolymers having styrene, vinyltoluene, α-methylstyrene, indene, or the like as a main component. From a viewpoint of compatibility with the rubber component (A), it is preferable that the $C_5$-$C_9$ resin is a resin in which the amount of components of $C_9$ or higher is small. Herein, the phrase "the amount of components of $C_9$ or higher is small" means that components of $C_9$ or higher compose less than 50 mass %, and preferably no greater than 40 mass %, of the total amount of the resin. The $C_5$-$C_9$ resin may be a commercially available product. Examples include the product "Quintone® G100B" (produced by Nippon Zeon Co., Ltd.) and the product "ECR213" (produced by ExxonMobil Chemical Company).

The dicyclopentadiene resin is a petroleum resin that is produced using dicyclopentadiene obtained through dimerization of cyclopentadiene as a main raw material. The dicyclopentadiene resin may be a commercially available product. Examples include the products "1105", "1325", and "1340" from the "Quintone® 1000" series, which are alicyclic petroleum resins produced by Nippon Zeon Co., Ltd.

The rosin resin may be a natural resin having a rosin acid (for example, abietic acid, palustric acid, or isopimaric acid) as a main component, or may be a modified resin or hydrogenated resin produced by subjecting a natural resin such as mentioned above to modification or hydrogenation. The rosin resin is obtained as a residue after distilling turpentine from collected balsam such as pine resin, which is the sap from a plant of the pine family. Examples include natural resin rosin, or a polymerized rosin or partially hydrogenated rosin thereof; a glycerin ester rosin, or a partially hydrogenated rosin, completely hydrogenated rosin, or polymerized rosin thereof; and a pentaerythritol ester rosin, or a partially hydrogenated rosin or polymerized rosin thereof. The natural resin rosin may, for example, be gum rosin, tall oil rosin, or wood rosin contained in raw rosin or tall oil. The rosin resin may be a commercially available product. Examples include the product "NEO-TALL 105" (produced by Harima Chemicals Group, Inc.), the product "SN-TACK 754" (produced by San Nopco Limited), the products "Lime Resin No. 1", "PENSEL A", and "PENSEL AD" (produced by Arakawa Chemical Industries, Ltd.), the products "Poly-Pale" and "Pentalyn C" (produced by Eastman Chemical Company), and the product "Highrosin® S" (Highrosin is a registered trademark in Japan, other countries, or both) (produced by Taishamatsu essential oil Co., Ltd.).

The alkyl phenolic resin can be obtained through a condensation reaction of an alkyl phenol and formaldehyde in the presence of a catalyst. The alkyl phenolic resin may be a commercially available product. Examples include the product "Hitanol 1502P" (produced by Hitachi Chemical Co., Ltd.), the product "TACKIROL 201" (produced by Taoka Chemical Co., Ltd.), the product "TACKIROL 250-I" (brominated alkyl phenol-formaldehyde resin, bromination rate 4%, produced by Taoka Chemical Co., Ltd.), the product "TACKIROL 250-III" (brominated alkyl phenol-formaldehyde resin, produced by Taoka Chemical Co., Ltd.), the products "R7521P", "SP1068", "R7510PJ", "R7572P", and "R7578P" (produced by Schenectady), and the product "R7510PJ" (produced by SI Group, Inc.).

The terpene phenolic resin can be obtained by causing a terpene and various phenols to react using a Friedel-Crafts catalyst, or by further condensing the resultant product with formalin. Although no specific limitations are placed on the terpene used as a raw material, the terpene is preferably a monoterpene hydrocarbon such as α-pinene or limonene, more preferably includes α-pinene, and is particularly preferably α-pinene. The terpene phenolic resin may be a commercially available product. Examples include the products "TAMANOL 803L" and "TAMANOL 901" (produced by Arakawa Chemical Industries, Ltd.) and products from the "YS POLYSTER U" series, the "YS POLYSTER T" series, the "YS POLYSTER S" series, the "YS POLYSTER G" series, the "YS POLYSTER N" series, the "YS POLYSTER K" series, and the "YS POLYSTER TH" series (produced by Yasuhara Chemical Co., Ltd.).

The presently disclosed rubber composition contains a filler (C). The filler (C) includes silica in an amount of at least 70 mass %, preferably at least 80 mass %, and more preferably at least 90 mass %. The percentage of silica in the filler (C) does not have a specific upper limit and silica may compose the entirety of the filler (C). As a result of the percentage of silica in the filler (C) being at least 70 mass %, tan δ of the rubber composition at 60° C. is lowered and fuel efficiency during normal running of a tire in which the rubber composition is used is improved.

No specific limitations are placed on the silica, which may, for example, be wet silica (hydrous silica), dry silica (anhydrous silica), calcium silicate, or aluminum silicate. Among these examples, wet silica is preferable. One of these types of silica may be used individually, or two or more of these types of silica may be used together.

The amount of silica that is compounded relative to 100 parts by mass of the rubber component in the presently disclosed rubber composition is preferably in a range of from 40 parts by mass to 70 parts by mass, and more preferably in a range of from 45 parts by mass to 60 parts by mass. Compounding of at least 40 parts by mass of silica relative to 100 parts by mass of the rubber component can lower tan δ of the rubber composition at 60° C. and improve fuel efficiency during normal running of a tire in which the rubber composition is used. On the other hand, compounding of no greater than 70 parts by mass of silica relative to 100 parts by mass of the rubber component increases the flexibility of the rubber composition such that use of the rubber composition in tread rubber of a tire can increase the deformation volume of the tread rubber, and thereby improve wet performance of the tire.

The filler (C) of the presently disclosed rubber composition preferably further includes carbon black. The amount of carbon black that is compounded relative to 100 parts by mass of the rubber component is preferably in a range of from 1 part by mass to 10 parts by mass, and more preferably in a range of from 3 parts by mass to 8 parts by mass. Compounding of at least 1 part by mass of carbon black can improve rigidity of the rubber composition, whereas compounding of no greater than 10 parts by mass of carbon black can suppress a rise in the loss tangent (tan δ) such that use of the rubber composition in tread rubber of a tire can provide the tire with a balance of high levels of fuel efficiency and wet performance.

No specific limitations are placed on the carbon black, which may, for example, be GPF, FEF, HAF, ISAF, or SAF grade carbon black. Among these examples, ISAF and SAF grade carbon black are preferable from a viewpoint of improving tire wet performance. One of these types of carbon black may be used individually, or two or more of these types of carbon black may be used together.

Besides the silica and carbon black described above, the filler (C) may include aluminum hydroxide, alumina, clay, calcium carbonate, or the like.

The amount of the filler (C) that is compounded relative to 100 parts by mass of the rubber component in the presently disclosed rubber composition is preferably from 30 parts by mass to 100 parts by mass, and more preferably from 40 parts by mass to 80 parts by mass. When the compounded amount of the filler (C) in the rubber composition is within either of the ranges set forth above, use of the rubber composition in tread rubber of a tire can further improve fuel efficiency of the tire in low-temperature environments and wet performance of the tire.

The presently disclosed rubber composition may further contain a softener (D) from a viewpoint of processability and operability. The amount of the softener (D) that is compounded relative to 100 parts by mass of the rubber component is preferably in a range of from 1 part by mass to 5 parts by mass, and more preferably in a range of from 1.5 parts by mass to 3 parts by mass. Compounding of at least 1 part by mass of the softener (D) facilitates kneading of the rubber composition, whereas compounding of no greater than 5 parts by mass of the softener (D) can suppress reduction in rigidity of the rubber composition.

Examples of the softener (D) include mineral-derived mineral oil, petroleum derived aromatic oil, paraffinic oil, and naphthenic oil, and natural product-derived palm oil, among which, mineral-derived softeners and petroleum-derived softeners are preferable from a viewpoint of tire wet performance.

The presently disclosed rubber composition preferably further contains a silane coupling agent in order to enhance the compounding effect of silica. Examples of silane coupling agents that can be used include, but are not specifically limited to, bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzothiazolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, and dimethoxymethylsilylpropylbenzothiazolyltetrasulfide. One of such silane coupling agents may be used individually, or two or more of such silane coupling agents may be used in combination.

The amount of the silane coupling agent that is compounded relative to 100 parts by mass of the silica is preferably in a range of from 2 parts by mass to 20 parts by mass, and more preferably in a range of from 5 parts by mass to 15 parts by mass. Compounding of at least 2 parts by mass of the silane coupling agent relative to 100 parts by mass of the silica sufficiently enhances the compounding effect of the silica, whereas compounding of no greater than 20 parts by mass of the silane coupling agent relative to 100 parts by mass of the silica reduces the probability of gelling of the rubber component occurring.

The presently disclosed rubber composition preferably further contains a fatty acid metal salt. The metal in the fatty acid metal salt may, for example, be Zn, K, Ca, Na, Mg, Co, Ni, Ba, Fe, Al, Cu, or Mn, and is preferably Zn. On the other hand, the fatty acid in the fatty acid metal salt may, for example, be a saturated or unsaturated fatty acid having a carbon number of from 4 to 30 and a linear, branched, or cyclic structure, or may be a mixture of such fatty acids. Among these fatty acids, a saturated or unsaturated linear fatty acid having a carbon number of from 10 to 22 is preferable. Examples of saturated linear fatty acids having a carbon number of from 10 to 22 include lauric acid, myristic acid, palmitic acid, and stearic acid, and examples of unsaturated linear fatty acids having a carbon number of from 10 to 22 include oleic acid, linoleic acid, linolenic acid, and arachidonic acid. One fatty acid metal salt may be used individually, or two or more fatty acid metal salts may be used in combination.

The amount of the fatty acid metal salt that is compounded relative to 100 parts by mass of the rubber component (A) is preferably in a range of from 0.1 parts by mass to 10 parts by mass, and more preferably in a range of from 0.5 parts by mass to 5 parts by mass.

Besides the rubber component (A), the thermoplastic resin (B), the filler (C), the softener (D), the silane coupling agent, and the fatty acid metal salt described above, the presently disclosed rubber composition may contain compounding agents normally used in the rubber industry, such as stearic acid, antioxidants, zinc oxide (zinc white), vulcanization accelerators, and vulcanizing agents, that are appropriately selected so as not to interfere with the objectives of the present disclosure. Commercially available products can be suitably used as these compounding agents. However, from a viewpoint of lowering the storage modulus of the presently disclosed rubber composition at 1% dynamic strain and 0° C., the rubber composition preferably does not contain a thermosetting resin such as a novolac-type or resol-type phenolic resin, or a resorcinol resin.

The presently disclosed rubber composition preferably contains three types of vulcanization accelerators.

The presently disclosed rubber composition can be used in tires and various other rubber products, and is particularly suitable for tread rubber of a tire.

Method for Producing Rubber Composition

The following provides a detailed description of the presently disclosed method for producing a rubber composition based on an embodiment thereof.

The presently disclosed method for producing a rubber composition is a method for producing the rubber composition described above and includes kneading the rubber component (A) including at least 50 mass % of at least one isoprene-based rubber selected from the group consisting of natural rubber and synthetic isoprene rubber, the thermoplastic resin (B), and the filler (C) including at least 70 mass % of silica at from 150° C. to 165° C., without a vulcanization compounding agent including a vulcanizing agent and a vulcanization accelerator.

As a result of the kneading being carried out at from 150° C. to 165° C. without the vulcanization compounding agent, compounding agents other than the vulcanization compounding agent can be homogeneously dispersed in the rubber component (A) while avoiding premature vulcanization (scorching), and thus the compounding effect of each of the compounding agents can be sufficiently exhibited, and tan δ of the rubber composition at 0° C. can be lowered while also reducing the difference between tan δ of the rubber composition at 30° C. and tan δ of the rubber composition at 60° C.

It should be noted that tan δ of the rubber composition, the differences between tan δ of the rubber composition at various temperatures, the storage modulus (E') of the rubber composition, and the tensile strength (Tb) of the rubber composition can be altered by, for example, adjusting the kneading temperature described above; the type and blending ratio of the rubber component (A); the type and amount of the thermoplastic resin (B); the silica content and type of silica in the filler (C); and the types and amounts of other compounding agents.

After the kneading at from 150° C. to 165° C. in the presently disclosed method for producing a rubber composition, further kneading may be performed at a different temperature that is lower than 150° C.

In the presently disclosed method for producing a rubber composition, the vulcanization compounding agent including the vulcanizing agent and the vulcanization accelerator is compounded after the compounding agents other than the vulcanization compounding agent have been homogeneously dispersed in the rubber component (A) to a sufficient extent, and is preferably kneaded therewith at a temperature that prevents premature vulcanization (scorching), such as from 90° C. to 120° C.

In the presently disclosed method for producing a rubber composition, the kneading time of kneading at each temperature can be set as appropriate, without any limitations, in consideration of the size of the kneading device, the volumes of raw materials, the types and states of the raw materials, and so forth.

The vulcanizing agent may, for example, be sulfur.

The amount of the vulcanizing agent, in terms of sulfur content, that is compounded relative to 100 parts by mass of the rubber component (A) is preferably in a range of from 0.1 parts by mass to 10.0 parts by mass, and more preferably in a range of from 1.0 parts by mass to 4.0 parts by mass. Compounding of the vulcanizing agent with a sulfur content of at least 0.1 parts by mass ensures fracture strength, wear resistance, and the like of the vulcanized rubber, whereas compounding of the vulcanizing agent with a sulfur content of no greater than 10.0 parts by mass ensures sufficient rubber elasticity. In particular, compounding of the vulcanizing agent with a sulfur content of no greater than 4.0 parts by mass enables further improvement of tire wet performance, and is preferable in terms of enhancing the advantageous effect of the disclosed techniques.

Examples of vulcanization accelerators that can be used include, but are not specifically limited to, thiazole vulcanization accelerators such as 2-mercaptobenzothiazole (M), dibenzothiazyl disulfide (DM), and N-cyclohexyl-2-benzothiazylsulfenamide (CZ), and guanidine vulcanization accelerators such as 1,3-diphenylguanidine (DPG). The presently disclosed rubber composition preferably contains three types of vulcanization accelerators as described above.

The amount of vulcanization accelerator that is compounded relative to 100 parts by mass of the rubber component (A) is preferably in a range of from 0.1 parts by mass to 5.0 parts by mass, and more preferably in a range of from 0.2 parts by mass to 3.0 parts by mass.

The presently disclosed rubber composition can be produced by, for example, using a Banbury mixer, a roller, or the like to perform kneading, as described above, of the the the rubber component (A), the thermoplastic resin (B), the filler (C), and various compounding agents that are appropriately selected as necessary, and then performing warming, extrusion, and so forth.

Tire

The presently disclosed tire includes tread rubber in which the rubber composition described above is used. The presently disclosed tire has excellent fuel efficiency in low-temperature environments and excellent wet performance as result of including tread rubber in which the rubber composition is used. The presently disclosed tire is applicable as a tire for various types of vehicles and is preferable as a tire for a passenger vehicle.

Depending on the type of tire that the presently disclosed tire is to be used as, the presently disclosed tire may be obtained by shaping the unvulcanized rubber composition and then performing vulcanization or may be obtained by shaping semi-vulcanized rubber obtained through preparatory vulcanization or the like, and then performing main vulcanization. The presently disclosed tire is preferably a pneumatic tire. The gas filling the pneumatic tire may be ordinary air or air with adjusted oxygen partial pressure, or may be an inert gas such as nitrogen, argon, or helium.

EXAMPLES

The following provides a more detailed description based on examples. However, the disclosed techniques are not in any way limited by the following examples.

<Production and Evaluation of Rubber Compositions>

Rubber compositions obtained according to the formulations in Tables 1 to 4 are each used in tread rubber to produce a radial tire of size 195/65R15 for a passenger vehicle. The following methods are used to evaluate the loss tangent (tan δ), the storage modulus (E'), and the tensile strength (Tb). The results are shown in Tables 1 to 4.

(1) Loss Tangent (Tan δ) and Storage Modulus (E')

A rubber sheet of 50 mm in length, 5 mm in width, and 2 mm in thickness cut from the tread rubber of the produced radial tire (size 195/65R15) for a passenger vehicle. A spectrometer produced by Ueshima Seisakusho Co., Ltd. is used to measure the loss tangent (tan δ) at 0° C., 30° C., and 60° C., and the storage modulus (E') at 0° C. with respect to the rubber sheet under conditions of an initial load of 160 mg, a dynamic strain of 1%, and a frequency of 52 Hz.

(2) Tensile Strength (Tb)

A rubber sheet is cut from the tread rubber of the produced radial tire (size 195/65R15) for a passenger vehicle using a DIN-53504, S3A-type cutter and the tensile strength (Tb) of the rubber sheet is measured in accordance with JIS K6251-1993.

<Production and Evaluation of Tires>

Rubber compositions obtained as described above are each used in tread rubber to produce a pneumatic radial tire of size 195/65R15 for a passenger vehicle. The following methods are used to evaluate fuel efficiency and wet performance (performance on a wet road surface) with respect to the tire. The results are shown in Tables 1 to 4.

(3) Fuel Efficiency

Sample tire are fitted onto a test vehicle and fuel efficiency was measured in an actual vehicle test conducted in an environment of either from 25° C. to 30° C. (normal temperature) or from 5° C. to 10° C. (low temperature). The results are expressed as index values relative to the fuel efficiency at low temperature of the tire in Comparative Example 1, which was set as 100, and are evaluated according to the following index.

Index value of at least 130: AA
Index value of at least 120 and less than 130: A
Index value of at least 110 and less than 120: B
Index value of at least 100 and less than 110: C
Index value of less than 100: D The difference between the index value for normal-temperature fuel efficiency and the index value for low-temperature fuel efficiency is calculated and is evaluated according to the following index.

Difference between index value for normal-temperature fuel efficiency and index value for low-temperature fuel efficiency of no greater than 5: A Difference between index value for normal-temperature fuel efficiency and index value for low-temperature fuel efficiency of greater than 5 and no greater than 10: B Difference between index value for normal-temperature fuel efficiency and index value for low-temperature fuel efficiency of greater than 10 and no greater than 15: C Difference between index value for normal-temperature fuel efficiency and index value for low-temperature fuel efficiency of greater than 15: D (4) Wet Performance Sample tires are fitted onto a test vehicle and an actual vehicle test on a wet road surface is conducted in which the driver gives the steering stability a subjective examination score. The results are expressed as index values relative to the subjective evaluation score for the tire of Comparative Example 1, which is set as 100. A larger index value indicates better wet performance.

TABLE 1

| | | | Comparative Example 1 | Example 1 | Example 2 | Example 3 | Comparative Example 2 | Comparative Example 3 |
|---|---|---|---|---|---|---|---|---|
| Formulation | Natural rubber *1 | Parts by mass | 40 | 60 | 80 | 100 | 40 | 40 |
| | Polybutadiene rubber *2 | | 60 | 40 | 20 | — | 60 | — |
| | Styrene-butadiene copolymer rubber *3 | | — | — | — | — | — | 60 |
| | Carbon black *4 | | 5 | 5 | 5 | 5 | 5 | 5 |
| | Silica *5 | | 50 | 50 | 50 | 50 | 50 | 50 |
| | Silane coupling agent *6 | | 4 | 4 | 4 | 4 | 4 | 4 |
| | C$_9$ resin *8 | | 2 | 15 | 15 | 15 | 15 | 15 |
| | Petroleum-based oil *14 | | 2 | 2 | 2 | 2 | 2 | 2 |
| | Antioxidant *16 | | 1 | 1 | 1 | 1 | 1 | 1 |
| | Stearic acid | | 1 | 1 | 1 | 1 | 1 | 1 |
| | Zinc white | | 2.5 | 2.5 | 2.5 | 2.5 | 2.5 | 2.5 |
| | Vulcanization accelerator A *17 | | 0.8 | 0.8 | 0.8 | 0.8 | 0.8 | 0.8 |
| | Vulcanization accelerator B *18 | | 1.1 | 1.1 | 1.1 | 1.1 | 1.1 | 1.1 |
| | Vulcanization accelerator C *19 | | 1 | 1 | 1 | 1 | 1 | 1 |
| | Sulfur | | 1.9 | 1.9 | 1.9 | 1.9 | 1.9 | 1.9 |
| | Percentage of isoprene-based rubber in rubber component | Mass % | 40 | 60 | 80 | 100 | 40 | 40 |
| | Percentage of silica in filler | | 90.9 | 90.9 | 90.9 | 90.9 | 90.9 | 90.9 |
| Physical properties | tan δ at 0° C. | | — | 0.31 | 0.325 | 0.339 | 0.360 | 0.424 | 0.680 |
| | tan δ at 30° C. | | 0.17 | 0.174 | 0.178 | 0.190 | 0.205 | 0.169 |
| | tan δ at 60° C. | | 0.12 | 0.129 | 0.133 | 0.149 | 0.163 | 0.111 |
| | tan δ at 0° C.-tan δ at 30° C. | | 0.137 | 0.152 | 0.161 | 0.169 | 0.219 | 0.511 |
| | tan δ at 30° C.-tan δ at 60° C. | | 0.05 | 0.044 | 0.045 | 0.042 | 0.042 | 0.078 |
| | E' at 0° C. | MPa | 26.00 | 10.03 | 10.49 | 11.40 | 10.29 | 9.48 |
| | Tb | | 30.73 | 26.80 | 26.62 | 25.41 | 27.10 | 24.26 |
| Evaluation results | Normal-temperature fuel efficiency | Index value | B | A | A | AA | B | B |

TABLE 1-continued

|  | Comparative Example 1 | Example 1 | Example 2 | Example 3 | Comparative Example 2 | Comparative Example 3 |
|---|---|---|---|---|---|---|
| Low-temperature fuel efficiency | C | A | A | A | B | C |
| Normal-temperature fuel efficiency-low-temperature fuel efficiency | B | A | A | A | A | C |
| Wet performance | 100 | 130 | 136 | 143 | 114 | 123 |

TABLE 2

| | | | Example 4 | Example 5 | Example 6 | Example 7 | Example 8 | Example 9 |
|---|---|---|---|---|---|---|---|---|
| Formulation | Natural rubber *1 | Parts by mass | 100 | 100 | 100 | 100 | 100 | 100 |
| | Carbon black *4 | | 5 | 5 | 5 | 5 | 5 | 5 |
| | Silica *5 | | 50 | 50 | 50 | 50 | 50 | 50 |
| | Silane coupling agent *6 | | 4 | 4 | 4 | 4 | 4 | 4 |
| | $C_5$ resin *7 | | 15 | — | — | — | — | — |
| | $C_5$-$C_9$ *9 | | — | 15 | — | — | — | — |
| | Dicyclopentadiene resin *10 | | — | — | 15 | — | — | — |
| | Rosin resin *11 | | — | — | — | 15 | — | — |
| | Alkyl phenolic resin *12 | | — | — | — | — | 15 | — |
| | Terpene phenolic resin *13 | | — | — | — | — | — | 15 |
| | Petroleum-based oil *14 | | 2 | 2 | 2 | 2 | 2 | 2 |
| | Antioxidant *16 | | 1 | 1 | 1 | 1 | 1 | 1 |
| | Stearic acid | | 1 | 1 | 1 | 1 | 1 | 1 |
| | Zinc white | | 2.5 | 2.5 | 2.5 | 2.5 | 2.5 | 2.5 |
| | Vulcanization accelerator A *17 | | 0.8 | 0.8 | 0.8 | 0.8 | 0.8 | 0.8 |
| | Vulcanization accelerator B *18 | | 1.1 | 1.1 | 1.1 | 1.1 | 1.1 | 1.1 |
| | Vulcanization accelerator C *19 | | 1 | 1 | 1 | 1 | 1 | 1 |
| | Sulfur | | 1.9 | 1.9 | 1.9 | 1.9 | 1.9 | 1.9 |
| | Percentage of isoprene-based rubber in rubber component | Mass % | 100 | 100 | 100 | 100 | 100 | 100 |
| | Percentage of silica in filler | | 90.9 | 90.9 | 90.9 | 90.9 | 90.9 | 90.9 |
| Physical properties | tan δ at 0° C. | — | 0.357 | 0.364 | 0.382 | 0.28256 | 0.319 | 0.352 |
| | tan δ at 30° C. | | 0.171 | 0.175 | 0.193 | 0.198 | 0.214 | 0.204 |
| | tan δ at 60° C. | | 0.125 | 0.122 | 0.139 | 0.195 | 0.213 | 0.183 |
| | tan δ at 0° C.-tan δ at 30° C. | | 0.186 | 0.189 | 0.189 | 0.08456 | 0.10523 | 0.148 |
| | tan δ at 30° C.-tan δ at 60° C. | | 0.046 | 0.052 | 0.054 | 0.003 | 0.001 | 0.02138 |
| | E' at 0° C. | MPa | 8.18 | 8.40 | 8.66 | 19.003 | 14.83 | 12.13 |
| | Tb | | 27.43 | 27.04 | 27.25 | 25.49 | 26.94 | 28.14 |
| Evaluation results | Normal-temperature fuel efficiency | Index value | A | A | A | B | A | B |
| | Low-temperature fuel efficiency | | A | A | A | B | A | B |
| | Normal-temperature fuel efficiency-low-temperature fuel efficiency | | A | A | A | A | A | A |
| | Wet performance | | 157 | 157 | 150 | 140 | 137 | 164 |

TABLE 3

| | | | Example 10 | Example 11 | Comparative Example 4 | Comparative Example 5 |
|---|---|---|---|---|---|---|
| Formulation | Natural rubber *1 | Parts by mass | 100 | 100 | 100 | 100 |
| | Carbon black *4 | | 5 | 5 | 5 | 5 |
| | Silica *5 | | 50 | 50 | 50 | 50 |
| | Silane coupling agent *6 | | 4 | 4 | 4 | 4 |
| | $C_9$ resin *8 | | 8 | 30 | 2 | 45 |
| | Petroleum-based oil *14 | | 2 | 2 | 2 | 2 |
| | Antioxidant *16 | | 1 | 1 | 1 | 1 |
| | Stearic acid | | 1 | 1 | 1 | 1 |
| | Zinc white | | 2.5 | 2.5 | 2.5 | 2.5 |
| | Vulcanization accelerator A *17 | | 0.8 | 0.8 | 0.8 | 0.8 |
| | Vulcanization accelerator B *18 | | 1.1 | 1.1 | 1.1 | 1.1 |
| | Vulcanization accelerator C *19 | | 1 | 1 | 1 | 1 |
| | Sulfur | | 1.9 | 1.9 | 1.9 | 1.9 |
| | Percentage of isoprene-based rubber in rubber component | Mass % | 100 | 100 | 100 | 100 |

TABLE 3-continued

|  |  |  | Example 10 | Example 11 | Comparative Example 4 | Comparative Example 5 |
|---|---|---|---|---|---|---|
|  | Percentage of silica in filler |  | 90.9 | 90.9 | 90.9 | 90.9 |
| Physical properties | tan δ at 0° C. | — | 0.329 | 0.425 | 0.327 | 0.548 |
|  | tan δ at 30° C. |  | 0.178 | 0.218 | 0.232 | 0.227 |
|  | tan δ at 60° C. |  | 0.138 | 0.172 | 0.148 | 0.208 |
|  | tan δ at 0° C.-tan δ at 30° C. |  | 0.152 | 0.206 | 0.095 | 0.321 |
|  | tan δ at 30° C.-tan δ at 60° C. |  | 0.040 | 0.046 | 0.083 | 0.019 |
|  | E' at 0° C. | MPa | 11.05 | 12.16 | 25.21 | 15.45 |
|  | Tb |  | 26.61 | 22.83 | 24.95 | 24.95 |
| Evaluation results | Normal-temperature fuel efficiency | Index value | A | B | B | C |
|  | Low-temperature fuel efficiency |  | A | B | D | D |
|  | Normal-temperature fuel efficiency-low-temperature fuel efficiency |  | A | A | D | A |
|  | Wet performance |  | 141 | 164 | 107 | 179 |

TABLE 4

|  |  |  | Example 12 | Example 13 | Example 14 | Example 15 |
|---|---|---|---|---|---|---|
| Formulation | Natural rubber *1 | Parts by mass | 100 | 100 | 100 | 100 |
|  | Carbon black *4 |  | 5 | 15 | 5 | 5 |
|  | Silica *5 |  | 50 | 60 | 50 | 50 |
|  | Silane coupling agent *6 |  | 4 | 4.8 | 4 | 4 |
|  | C$_9$ resin *8 |  | 15 | 8 | 15 | 15 |
|  | Petroleum-based oil *14 |  | — | — | 2 | 2 |
|  | Natural product-based oil *15 |  | 2 | 17 | — | — |
|  | Antioxidant *16 |  | 1 | 1 | 1 | 1 |
|  | Stearic acid |  | 1 | 1 | 1 | 1 |
|  | Zinc white |  | 2.5 | 2.5 | 2.5 | 2.5 |
|  | Vulcanization accelerator A *17 |  | 0.8 | — | — | 0.8 |
|  | Vulcanization accelerator B *18 |  | 1.1 | — | — | 1.1 |
|  | Vulcanization accelerator C *19 |  | 1 | — | — | — |
|  | Vulcanization accelerator C *20 |  | — | 2.1 | 2.1 | 1 |
|  | Sulfur |  | 1.9 | 1.9 | 1.9 | 1.9 |
|  | Percentage of isoprene-based rubber in rubber component | Mass % | 100 | 100 | 100 | 100 |
|  | Percentage of silica in filler |  | 90.9 | 80.0 | 90.9 | 90.9 |
| Physical properties | tan δ at 0° C. | — | 0.413 | 0.346 | 0.311 | 0.356 |
|  | tan δ at 30° C. |  | 0.213 | 0.212 | 0.183 | 0.192 |
|  | tan δ at 60° C. |  | 0.169 | 0.163 | 0.140 | 0.147 |
|  | tan δ at 0° C.- tan δ at 30° C. |  | 0.200 | 0.134 | 0.128 | 0.164 |
|  | tan δ at 30° C.- tan δ at 60° C. |  | 0.044 | 0.049 | 0.043 | 0.041 |
|  | E' at 0° C. | MPa | 13.22 | 10.70 | 9.84 | 11.29 |
|  | Tb |  | 25.07 | 22.20 | 24.20 | 24.90 |
| Evaluation results | Normal-temperature fuel efficiency | Index value | B | B | A | B |
|  | Low-temperature fuel efficiency |  | B | B | A | B |
|  | Normal-temperature fuel efficiency-low-temperature fuel efficiency |  | A | A | A | A |
|  | Wet performance |  | 133 | 137 | 136 | 141 |

*1 Natural rubber: "SIR20" produced in Indonesia
*2 Polybutadiene rubber: Produced by JSR Corporation, product name "BR01"
*3 Styrene-butadiene copolymer rubber: Produced by JSR Corporation, product name "#1500"
*4 Carbon black: N234 (ISAF), produced by Asahi Carbon Co., Ltd., product name "#78"
*5 Silica: Produced by Tosoh Silica Corporation, product name "Nipsil AQ", BET surface area=205 m$^2$/g
*6 Silane coupling agent: Bis(3-triethoxysilylpropyl)disulfide, average sulfur chain length=2.35, silane coupling agent produced by Evonik Industries, product name "Si 75®" (Si 75 is a registered trademark in Japan, other countries, or both)
*7 C$_5$ resin: Produced by ExxonMobil Chemical Company, product name "Escorez® 1102B"
*8 C$_9$ resin: Produced by JX Nippon Oil & Energy Corporation, product name "Nisseki Neopolymer® 140" (Nisseki Neopolymer is a registered trademark in Japan, other countries, or both)
*9 C$_5$-C$_9$ petroleum resin: Produced by Nippon Zeon Co., Ltd., product name "Quintone® G100B"
*10 Dicyclopentadiene resin: Produced by Nippon Zeon Co., Ltd., product name "Quintone® 1105"
*11 Rosin resin: Produced by Taishamatsu essential oil Co., Ltd., product name "Highrosin® S"
*12 Alkyl phenolic resin: Produced by SI Group, Inc., product name "R7510PJ"

*13 Terpene phenolic resin: Produced by Yasuhara Chemical Co., Ltd., product name "YS POLYSTER® S145" (YS POLYSTER is a registered trademark in Japan, other countries, or both)
*14 Petroleum-based oil: Produced by Japan Energy Corporation, product name "Process X-140"
*15 Natural product-based oil: Produced by The Nisshin OilliO Group, Ltd., product name "Refined Palm Oil J (S)"
*16 Antioxidant: N-(1,3-Dimethylbutyl)-N'-phenyl-p-phenylenediamine, produced by Ouchi Shinko Chemical Industrial Co., Ltd., product name "NOCRAC 6C"
*17 Vulcanization accelerator A: 1,3-Diphenyl guanidine, produced by Sumitomo Chemical Co., Ltd., product name "SOXINOL® D-G" (SOXINOL is a registered trademark in Japan, other countries, or both)
*18 Vulcanization accelerator B: Dibenzothiazyl disulfide, produced by Ouchi Shinko Chemical Industrial Co., Ltd., product name "NOCCELER® DM-P" (NOCCELER is a registered trademark in Japan, other countries, or both)
*19 Vulcanization accelerator C: N-cyclohexyl-2-benzothiazylsulfenamide, produced by Ouchi Shinko Chemical Industrial Co., Ltd., product name "NOCCELER® CZ-G"
*20 Vulcanization accelerator D: Produced by Ouchi Shinko Chemical Industrial Co., Ltd., product name "NOCCELER® NS"

It can be seen from Tables 1 to 4 that a tire in which the presently disclosed rubber composition is used has high fuel efficiency in low-temperature environments and maintains adequate wet performance.

INDUSTRIAL APPLICABILITY

The presently disclosed rubber composition can be used in tread rubber of a tire. Moreover, the presently disclosed method for producing a rubber composition can be used to produce the presently disclosed rubber composition. Furthermore, the presently disclosed tire is applicable as a tire for various types of vehicles.

The invention claimed is:
1. A rubber composition comprising:
a rubber component (A) including at least 50 mass % of at least one isoprene-based rubber selected from the group consisting of natural rubber and synthetic isoprene rubber;
a thermoplastic resin (B); and
a filler (C) including at least 70 mass % of silica, wherein the thermoplastic resin (B) is contained in an amount of from 5 parts by mass to 40 parts by mass relative to 100 parts by mass of the rubber component (A),
tan δ of the rubber composition at 0° C. is no greater than 0.5,
a difference between tan δ of the rubber composition at 30° C. and tan δ of the rubber composition at 60° C. is no greater than 0.070, and
a storage modulus of the rubber composition at 1% dynamic strain and 0° C. is no greater than 20 MPa.
2. The rubber composition of claim 1, wherein
a difference between tan δ of the rubber composition at 0° C. and tan δ of the rubber composition at 30° C. is no greater than 0.30.
3. The rubber composition of claim 1, wherein
a difference between tan δ of the rubber composition at 0° C. and tan δ of the rubber composition at 60° C. is no greater than 0.35.
4. The rubber composition of claim 1, further comprising from 1 part by mass to 5 parts by mass of a softener (D) relative to 100 parts by mass of the rubber component.
5. The rubber composition of claim 4, wherein
the softener (D) is a mineral-derived or petroleum-derived softener.
6. The rubber composition of claim 1, wherein
the filler (C) further includes carbon black, and the carbon black is contained in an amount of from 1 part by mass to 10 parts by mass relative to 100 parts by mass of the rubber component.
7. The rubber composition of claim 1, wherein
the thermoplastic resin (B) is at least one resin selected from the group consisting of a $C_5$ resin, a $C_9$ resin, a $C_5$-$C_9$ resin, a dicyclopentadiene resin, a rosin resin, an alkyl phenolic resin, and a terpene phenolic resin.
8. A method for producing the rubber composition of claim 1, comprising
kneading the rubber component (A) including at least 50 mass % of at least one isoprene-based rubber selected from the group consisting of natural rubber and synthetic isoprene rubber, the thermoplastic resin (B), and the filler (C) including at least 70 mass % of silica at from 150° C. to 165° C., without a vulcanization compounding agent including a vulcanizing agent and a vulcanization accelerator.
9. A tire comprising tread rubber in which the rubber composition of claim 1 is used.
10. The rubber composition of claim 1, wherein the silica is contained in an amount of from 40 parts by mass to 70 parts by mass relative to 100 parts by mass of the rubber component.
11. The rubber composition of claim 1, wherein the silica is contained in an amount of from 45 parts by mass to 60 parts by mass relative to 100 parts by mass of the rubber component.

* * * * *